(12) United States Patent
Barsotti et al.

(10) Patent No.: US 7,129,290 B2
(45) Date of Patent: Oct. 31, 2006

(54) POLYMERIC CROSSLINKABLE COMPOSITIONS CONTAINING SPIROORTHOCARBONATES

(75) Inventors: Robert John Barsotti, Franklinville, NJ (US); Patrick Henry Corcoran, Cherry Hill, NJ (US); Neville Everton Drysdale, Newark, DE (US); Laura Ann Lewin, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 283 days.

(21) Appl. No.: 10/466,126

(22) PCT Filed: Jan. 11, 2002

(86) PCT No.: PCT/US02/00844

§ 371 (c)(1), (2), (4) Date: Jul. 9, 2003

(87) PCT Pub. No.: WO02/057339

PCT Pub. Date: Jul. 25, 2002

(65) Prior Publication Data

US 2004/0059067 A1 Mar. 25, 2004

(51) Int. Cl.
*C08K 3/20* (2006.01)
*C08L 75/04* (2006.01)

(52) U.S. Cl. ............. 524/591; 523/414; 523/415; 524/548; 524/555; 525/131; 525/327.3; 525/328.2; 525/440; 525/454; 525/455; 525/456; 525/457; 525/471; 525/472; 525/509; 525/523; 525/528

(58) Field of Classification Search ............... None
See application file for complete search history.

(56) References Cited

U.S. PATENT DOCUMENTS

| | | | | |
|---|---|---|---|---|
| 3,940,369 A | * | 2/1976 | Yukuta et al. | 528/60 |
| 3,968,084 A | * | 7/1976 | Yukuta et al. | 528/93 |
| 4,452,070 A | * | 6/1984 | Kipp | 73/49.8 |
| 4,738,899 A | * | 4/1988 | Bluestein et al. | 428/413 |
| 4,829,134 A | * | 5/1989 | Sakamoto et al. | 525/523 |
| 4,855,367 A | * | 8/1989 | Flury et al. | 252/507 |
| 5,556,896 A | * | 9/1996 | Byerley et al. | 523/116 |
| 5,808,108 A | | 9/1998 | Chappelow et al. | 549/335 |
| 6,218,482 B1 | * | 4/2001 | Yamanaka et al. | 525/524 |
| 6,297,329 B1 | | 10/2001 | van den Berg et al. | 525/410 |

FOREIGN PATENT DOCUMENTS

| | | | |
|---|---|---|---|
| JP | 60028427 A | * | 2/1985 |
| JP | 61-64725 A | * | 4/1986 |
| JP | 63277220 A | * | 11/1988 |
| JP | 02185557 A | * | 7/1990 |
| WO | WO 97/31073 | | 8/1997 |
| WO | WO 00/40280 | | 7/2000 |

OTHER PUBLICATIONS

CAPLUS accession No. 1995:837217 for the Gaodeng Xuexiao Xuebao article by Bai et al., vol. 16, No. 9, 1995.*
CAPLUS accession No. 1995:1004236 for the Gongneng Gaofenzi Xuebao article by Bai et al., vol. 8, No. 3, 1995.*
CAPLUS accession No. 1997:62090 for the Zhongguo Kexue Jishu article by Bai et al., vol. 26, No. 3, 1996.*
CAPLUS accession No. 1996:514669 for the Shenyang Huagong Xueyuan Xuebao article by Wang et al., vol. 10, No. 2, 1996.*
Wang et al., "Study on epoxy resin modified with prepolymers containing spiroorthocarbonate," Journal of Materials Science Letters, vol. 18, 1999, pp. 1259-1262.*
ChemiCool, definitions for hydrocarbyl and hydrocarbon, 2005.*
Chemical abstracts registry No. 96837-22-8 for norbornene spiroorthocarbonate, 1967.*
Caiyuan Pan, Jinying Yuan and Ruke Bai, Synthesis, cationic polymerization and curing reaction with epoxy resin of 3,9-di(p-methoxy-benzyl)-1, 5, 7, 11-tetra-oxaspiro(5,5) undecane, Polymer International, 49, 74-80, (2000).

* cited by examiner

*Primary Examiner*—Robert Sellers
(74) *Attorney, Agent, or Firm*—Sudhir G. Deshmukh; John H. Lamming

(57) ABSTRACT

Polymeric compositions containing spiroorthocarbonate groups and another functional group which reacts with hydroxyl groups are readily crosslinked on contact with water. These compositions are useful as sealants, coatings and encapsulants.

13 Claims, No Drawings

POLYMERIC CROSSLINKABLE COMPOSITIONS CONTAINING SPIROORTHOCARBONATES

FIELD OF THE INVENTION

Polymeric compositions containing spiroorthocarbonate groups are crosslinked by hydrolyzing the spiroorthocarbonate groups, and reacting the hydroxyl groups that are formed to crosslink the composition.

TECHNICAL BACKGROUND

The crosslinking (curing) of polymers is an important commercial activity, useful, for example, in elastomers, in coatings, and in thermoset materials such as are used for electronics. Controlling when and under what conditions crosslinking takes place is usually critical since once a polymer is crosslinked it is usually not "workable", that is it may not be reshaped. In some applications, such as coatings and electronic applications it may be desirable or even mandatory that no lower molecular weight compounds be volatilized during or after the crosslinking of the polymers, so as not to contaminate sensitive equipment such as electronics, and/or to pollute the environment, as in the case of coatings.

Numerous ways have been found to avoid the production of volatile compounds during curing. For example the reaction of epoxy groups with other groups such as hydroxyl groups may accomplish this result, but it is sometimes difficult to control after the ingredients are mixed and/or higher temperatures are required. To avoid these types of problems, especially in coatings which often must be cured under conditions close to ambient conditions and which often must be stable for long periods before curing, other solutions have been found, such as the use of spiroorthoesters, see for instance World Patent Application 9731073. However new and/or improved methods of crosslinking polymers are always of interest.

For coatings, basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for coating formulations which provide outstanding performance characteristics after application, and particularly mar-resistance and resistance to environmental etching. Heretofore, mar-resistant coatings were attained by softening the coating, which depreciates other performance characteristics. The instant invention helps overcome this problem.

In repairing damage, such as dents to auto bodies, the original coating in and around the damaged area is typically sanded or ground out by mechanical means. Some times the original coating is stripped off from a portion or off the entire auto body to expose the bare metal underneath. After repairing the damage, the repaired surface is coated, preferably with low VOC coating compositions, typically in portable or permanent low cost painting enclosures vented to atmosphere to remove the organic solvents from the freshly applied paint coatings in environmentally safe manner. Typically, the drying and curing of the freshly applied paint takes place within these enclosures. Furthermore, the foregoing drying and curing steps take place within the enclosure to also prevent the wet paint from collecting dirt in the air or other contaminants.

As these paint enclosures take up significant floor space of typical small auto body paint repair shops, these shops prefer to dry and cure these paints as fast as possible. More expensive enclosures are frequently provided with heat sources, such as conventional heat lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for low VOC fast curing coating formulations which cure under ambient conditions while still providing outstanding performance characteristics, particularly overcoming mar problems and resistance to environmental etching.

Spiroorthocarbonates have been used in a variety of crosslinkable polymeric systems, usually helping to crosslink the system by cationic polymerization of the spiroorthocarbonate groups and sometimes (co)polymerizing other groups such as epoxides, see for instance World Patent Application 0040280, U.S. Pat. No. 5,808,108, and C. Pan, et al., Polym. Int., Vol. 49, p. 74–80 (2000). None of these references describe the crosslinking of spiroorthocarbonate containing compositions via hydrolysis of the spiroorthocarbonate groups.

SUMMARY OF THE INVENTION

This invention concerns a first composition, comprising,
- (a) (i) a first polymer having one or more intact spiroorthocarbonate groups attached to a molecule of said first polymer;
- (ii) a crosslinking agent containing first functional groups which react with hydroxyl groups, provided that said crosslinking agent has an average of at least 2 first functional groups per molecule of said crosslinking agent; and
- (iii) optionally one or more of: one or more solvents; one or more first catalysts for the reaction of said hydroxyl groups with said first functional groups; and one or more second catalysts for hydrolysis of said spiroorthocarbonate groups; or
- (b) (i) a second polymer having second functional groups which react with hydroxyl groups, provided that said second polymer has an average of at least 2 second functional groups per molecule of said second polymer;
- (ii) a compound containing at least one intact spiroorthocarbonate group; and
- (iii) optionally one or more of: one or more solvents; one or more first catalysts for the reaction of said hydroxyl groups with said second functional groups; and one or more second catalysts for hydrolysis of said spiroorthocarbonate groups.

Also disclosed herein is a second composition, comprising,
- (a) (i) a first polymer having one or more intact spiroorthocarbonate groups attached to a molecule of said first polymer;
- (ii) a crosslinking agent containing first functional groups which react with hydroxyl groups, provided that said crosslinking agent has an average of at least 2 first functional groups per molecule of said crosslinking agent;
- (iii) water; and (iv) optionally one or more of one or more solvents; one or more first catalysts for the reaction of said hydroxyl groups with said first functional groups; and one or more second catalysts for hydrolysis of said spiroorthocarbonate groups; or (b) (i) a second polymer having second functional groups which react with hydroxyl groups, provided that said second polymer has an average of at least 2 second functional groups per molecule of said second polymer, (ii) a compound containing at least one intact spiroorthocarbonate group;

(iii) water, and (iv) optionally one or more of: one or more solvents; one or more first catalysts for the reaction of said hydroxyl groups with said second functional groups; and one or more second catalysts for hydrolysis of said spiroorthocarbonate groups.

Also described herein is a first process for the crosslinking of a polymeric composition, comprising, exposing said polymeric composition in the uncrosslinked form to water for a period of time to crosslink said polymeric composition, provided that said polymeric composition comprises (a) (i) a first polymer having one or more intact spiroorthocarbonate groups attached to said first polymer, (ii) a crosslinking agent containing first functional groups which react with hydroxyl groups, provided that said crosslinking agent has an average of at least 2 first functional groups per molecule of said crosslinking agent; and (iii) optionally one or more of one or more solvents; one or more catalysts for the reaction of said hydroxyl groups with said first functional groups; and one or more catalysts for hydrolysis of said spiroorthocarbonate groups; or (b) (i) a second polymer having second functional groups which react with hydroxyl groups, provided that said second polymer has an average of at least 2 second functional groups per molecule of said second polymer, (ii) a compound containing at least one intact spiroorthocarbonate group; and (iii) optionally one or more of: one or more solvents; one or more catalysts for the reaction of said hydroxyl groups with said second functional groups; and one or more catalysts for hydrolysis of said spiroorthocarbonate groups.

This invention also involves a second process for forming a crosslinked coating, comprising, applying a polymeric coating composition to a substrate in an uncrosslinked form, exposing said polymeric coating composition in an uncrosslinked form to water, and allowing said polymeric coating composition in an uncrosslinked form to crosslink, provided that said polymeric composition comprises (a) (i) a first polymer having one or more intact spiroorthocarbonate groups attached to said first polymer, (ii) a crosslinking agent containing first functional groups which react with hydroxyl groups, provided that said crosslinking agent has an average of at least 2 first functional groups per molecule of said crosslinking agent; and (iii) optionally one or more of one or more solvents; one or more catalysts for the reaction of said hydroxyl groups with said first functional groups; and one or more catalysts for hydrolysis of said spiroorthocarbonate groups; or (b) (i) a second polymer having second functional groups which react with hydroxyl groups, provided that said second polymer has an average of at least 2 second functional groups per molecule of said second polymer, (ii) a compound containing at least one intact spiroorthocarbonate group; and (iii) optionally one or more of: one or more solvents; one or more catalysts for the reaction of said hydroxyl groups with said second functional groups; and one or more catalysts for hydrolysis of said spiroorthocarbonate groups.

DETAILS OF THE INVENTION

By polymers herein are meant not only higher molecular weight polymers, with weight average molecular weights greater than 3000, but also lower molecular weight polymers, sometimes called oligomers, with weight average molecular weights in the range, for example 300 to 3000.

By a spiroorthocarbonate group herein is meant a group of the formula

(III)

By an intact spiroorthocarbonate group is meant that the two rings of the spiro group are still present, at least before any desired reaction such as hydrolysis takes place.

A preferred compound containing a spiroorthocarbonate group is a compound of the formula

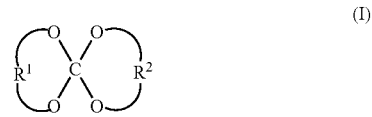

(I)

wherein $R^1$ and $R^2$ are hydrocarbylene or substituted hydrocarbylene bridging groups which have at least two bridging carbon atoms. It is preferred that there independently be 2 or 3 atoms in each bridge between oxygen atoms in (I). By hydrocarbylene is meant an group containing only carbon and hydrogen which has two free valences to carbon atoms, and both free valences are not to the same carbon atom. By substituted hydrocarbylene is meant one or more hydrogen atoms are substituted for by a functional group which does not interfere with the desired reactions of, or the formation of, the compound involved. Suitable functional groups include halo, ether including alkoxy, hydroxyl, etc.

"Preferred groups for $R^1$ and $R^2$ each independently have the forumula—$CR^3R^4$—$CR^5R^6$—$(CR^7R^8)_n$— wherein n is 0 or 1, and each of $R^3$, $R^4$, $R^5$, $R^6$, $R^7$ and $R^8$ is hydrogen, hydrocarbyl or substituted hydrocarbyl, provided that any two of $R^3$, $R^4$, $R^5$, $R^6$, $R^7$ and $R^8$ vicinal or geminal to each other taken together may form a ring. In one preferred form $R^1$ and $R^2$ are the same. Independently preferred groups for $R^3$, $R^4$, $R^5$, $R^6$, $R^7$ and $R^8$ are hydrogen; alkyl, especially alkyl containing 1 to 10 carbon atoms, more preferably methyl or ethyl; and hydroxyalkyl, especially hydroxymethyl. Substitution patterns for specific preferred compounds (I) are given in Table 1."

TABLE 1

| Compound | R¹ | | | | | | | R² | | | | | | |
|---|---|---|---|---|---|---|---|---|---|---|---|---|---|---|
| | $R^3$ | $R^4$ | $R^5$ | $R^6$ | $R^7$ | $R^8$ | n | $R^3$ | $R^4$ | $R^5$ | $R^6$ | $R^7$ | $R^8$ | n |
| A | $CH_3$ | H | H | H | H | H | 1 | $CH_3$ | H | H | H | H | H | 1 |
| B | H | H | $CH_2OH$ | $C_2H_5$ | H | H | 1 | H | H | $CH_2OH$ | $C_2H_5$ | H | H | 1 |
| C | H | H | H | H | — | — | 0 | H | H | $CH_2OH$ | $C_2H_5$ | H | H | 1 |
| D | H | H | H | H | H | H | 1 | H | H | $CH_2OH$ | $C_2H_5$ | H | H | 1 |
| E | H | H | H | H | H | H | 1 | H | H | H | H | H | H | 1 |
| F | $CH_3$ | H | H | H | — | — | 0 | $CH_3$ | H | H | H | — | — | 0 |
| G | H | H | H | H | — | — | 0 | H | H | H | H | — | — | 0 |
| H | H | H | n-$C_4H_9$ | $C_2H_5$ | H | H | 1 | H | H | n-$C_4H_9$ | $C_2H_5$ | H | H | 1 |
| I | H | H | n-$C_8H_{17}$ | H | — | — | 0 | H | H | n-$C_8H_{17}$ | H | — | — | 0 |

The spiroorthocarbonates can be made by the reaction of an appropriate diol (not including for example any other hydroxyalkyl groups which may also be present in the "diol") with a tetralkylorthocarbonate under reflux to remove byproduct alcohol derived from the alkyl group of the tetralkylorthocarbonate. If $R^1$ and $R^2$ are to be the same a single diol is used, while if $R^1$ and $R^2$ are different two different diols are used, and the product may be a mixture of 2 symmetrical spiroorthocarbonates and one unsymmetrical orthocarbonate, and these three spiroorthocarbonates may be in equilibrium with each other. For instance, compound A is prepared from 1,3-butanediol, B from trimethylolpropane, C from trimethylolpropane and ethylene glycol, D from trimethylolpropane and 1,3-propanediol, E from 1,3-propanediol, F from 1,2-propanediol, g from ethylene glycol, H from 2, butyl-2-ethyl-1,3-propanediol, and I from 1,2-decanediol. Further details on synthesis of these compounds will be found in the Experiments and U.S. Pat. Nos. 5,808, 108 and 5,298,631; R. Bai, et al., *Gaofenzi Xuebao*, p. 21–27 (1996); R. Bai, et al., *Gongneng Gaofenzi Xuebao*, vol. 8, p. 321–327 (1995); Japanese Patent Application 60204789; all of which are hereby included by reference.

In the crosslinkable compositions herein spiroorthocarbonate groups are present in some form (see below), and to initiate the crosslinking reaction water comes in contact with these groups to hydrolyze them. This hydrolysis may be quite rapid, see for instance P. Deslongchamps, et al., *Tetrahedron*, vol. 56, p. 3533–3537 (2000). When a spiroorthocarbonate is simply hydrolyzed a "linear" carbonate linkage is formed, together with 2 hydroxyl groups, as illustrated below for the reaction of Compound E:

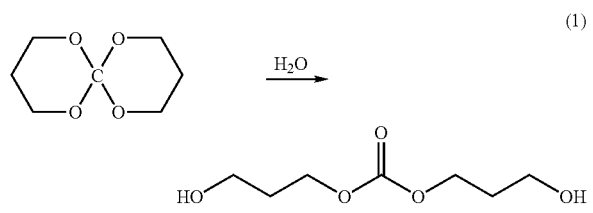

(1)

Note that in this reaction, no relatively volatile low molecular weight products are produced. Since these reactions may be acid catalyzed some of the ring opening of the spiroorthocarbonates may lead to cationic polymerization rather than simple ring opening. Herein preferably the major molar portion of the spiroorthocarbonates present, more preferably at least about 75 mole percent, and especially preferably at least 90 molar percent simply ring open and do not polymerize.

In the first and second compositions herein, and in the materials used in the first and second processes, in (a)(i) and (b)(ii) the spiroorthocarbonate groups may be included by a variety of methods. In one instance [in (b)(ii)] the spiroorthocarbonate may be included as a "monomeric" compound, such as compound E, which may hydrolyze, thus providing reactive hydroxyl groups. Alternatively, the spiroorthocarbonate groups may be part of a (possibly low molecular weight) polymer [in (a)(i)]. For example a dihydroxyspiroorthocarbonate (which has not yet been hydrolyzed) such as Compound B may be reacted with an excess of a diisocyanate such as bis(4-isocyanatophenyl)methane (MDI), toluene diisocyanate (TDI), hexamethylene diisocyanate (HMDI) or isophorone diisocyanate (IPDI) to form an isocyanate ended "prepolymer", which upon exposure to water undergoes hydrolysis of the spiroorthocarbonate forming hydroxyl groups, which react with the remaining isocyanate groups to crosslink the polymer. Since spiroorthocarbonates often hydrolyze faster than isocyanate reacts with water, this is believed to be main mode of the crosslinking reaction for this type of polymer. Other diols such as ethylene glycol or 1,4-butanediol may also be copolymerized into the (pre)polymer formed. It is noted that in this type of isocyanate containing (pre)polymer, the spiroorthocarbonate group is (at least before hydrolysis) part of the main chain (not on a branch) of the polymer formed.

However, the spiroorthocarbonate may also be present in the polymer as part of a branch. For example, a monohydroxyl spiroorthocarbonate such as Compound D may be converted to a (meth)acrylate ester by esterification and the resulting (meth)acrylic ester,

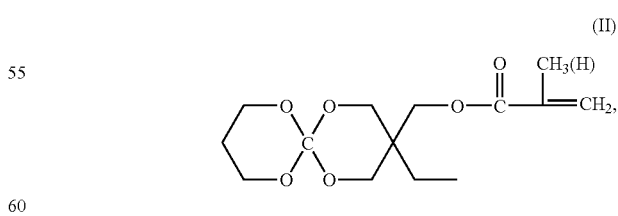

(II)

may be free radically copolymerized with other free radically copolymerizable monomers such as (meth)acrylates and styrenes. Analogous variations will be obvious to the skilled artisan.

Also present in these compositions, as (a)(ii) or (b)(i), and the processes in which they are used is a material having a first or second functional group which reacts with hydroxyl groups. This reaction should take place under the conditions chosen for the crosslinking reaction. These conditions may be ambient conditions or heating or other conditions that may be used to prod the reaction to proceed. Preferably the reaction with hydroxyl groups should not produce any volatile low molecular weight compounds, except those normally found in air ($CO_2$, water, etc.) Typical groups which react with hydroxyl groups include isocyanates (including isocyanurate trimers), epoxides, carboxylic acid anhydrides (especially those which are parts of polymers), melamine, and silane(s). Isocyanates, melamine and silane are especially preferred for coatings.

In (a)(i) the first polymer contains intact (before hydrolysis) spiroorthocarbonate groups, and a crosslinking agent contains first functional groups which react with hydroxyl groups. The crosslinking agent may be a monomeric compound such as a diisocyanate such as MDI, TDI, HMDI or IPDI, or an epoxy resin, or may be a polymer containing first functional groups. For example it may be (meth)acrylate copolymer containing repeat units derived from 2-isocyanatoethyl (meth)acrylate or glycidyl (meth)acrylate. It is also possible that (a)(i) and (a)(ii) are "combined" in the same polymer, that is a single polymer acts as both (a)(i) and (a)(ii). For example one can copolymerize (II) with 2-isocyanatoethyl (meth)acrylate or glycidyl (meth)acrylate and optionally other copolymerizable monomers. When that single polymer is exposed to moisture presumably the spiroorthocarbonate groups will hydrolyze forming hydroxyl groups, which in turn will react with the isocyanate, carboxylic acid anhydride, melamine, silane(s) or epoxide groups, whichever are present. This (a)(i) and (a)(ii) and may be combined as a single polymer or may be more than one substance.

In a similar manner, (b)(ii) may be a monomeric compound containing one or more spiroorthocarbonate groups, more preferably one spiroorthocarbonate group.

In any of the compositions herein the polymeric materials may range from relatively low to relatively high molecular weight. It is preferred that they be of relatively low molecular weight so as to keep the viscosity of the compositions before crosslinking low, so as to avoid or minimize the need for solvent(s).

The second composition herein contains water. It is to be understood that as the water contacts the spiroorthocarbonate groups present in the composition, the spiroorthocarbonate groups will start to hydrolyze, eventually leading to crosslinking of the composition. This is basically what happens in the first and second process herein. The water may be introduced in a variety of ways. For example, especially in the case of a coating the water may introduced into the uncrosslinked or crosslinking (while the crosslinking is taking place) coating by absorption from the air. This is very convenient for making an uncrosslinked coating composition which is stable until exposed to (moist) air. Alternatively water may be mixed in a mixing head or spray mixing head (for a coating) just before crosslinking is to take place. This is particularly useful for making thicker crosslinked items such as electronic encapsulants where diffusion of moisture into a thicker section will take longer. The introduction of water should be at a point where the final shape of the polymeric crosslinked part can be formed before crosslinking takes place.

Other materials which may optionally be present in the compositions and processes include one or more solvents (and are meant to act only as solvents). These preferably do not contain groups such as hydroxyl or primary or secondary amino which can react with either the first or second functional groups and/or spiroorthocarbonates. One or more catalysts for the hydrolysis of spiroorthocarbonates may be present. These are typically Bronsted acids, but these acids should not be so strong as cause substantial cationic ring opening polymerization of the spiroorthocarbonates and/or epoxides which may be present. If substantial cationic ring opening polymerization of spiroorthocarbonate groups takes place, this will often lead to premature crosslinking of the composition. The same caveats may be said for any catalysts which may be present which catalyze the reaction of hydroxyl groups with the first or second functional groups. What these catalysts may be will depend on what the first or second functional group(s) present are. Such catalysts are known in the art, for example, for the isocyanate hydroxyl reaction, a wide variety of catalyst can be used such as tin compounds, including dibutyltin dilaurate and tertiary amines such as triethylene diamine. These catalysts can be used alone or in conjunction with carboxylic acids such as acetic acid.

The present compositions, and the process for making them crosslinked, are useful as encapsulants, sealants, and coatings. They are useful as coatings, especially transportation (automotive) coatings and industrial coatings. As transportation coating they are useful as both OEM (original equipment manufacturer) and automotive refinish coatings. They may also be used as primer coatings. They often cure under ambient conditions to tough hard coatings and may be used as one or both of the so-called base coat and clear coat automotive coatings. This makes them particularly useful for repainting of transportation vehicles in the field. An advantage of the present materials and processes in encapsulants and sealants is that when spiroorthocarbonates are used in crosslinking reactions the resulting product does not shrink or shrink as much as usual in a typical crosslinking reaction. This means any volume to be filled by the crosslinked material will be more reliably filled with a lessened chance of voids being present due to shrinkage during crosslinking.

For whatever uses they are put to, the compositions, and the materials used in the processes described herein may contain other materials which are conventionally used in such uses. For example, for use as encapsulants and sealants the composition may contain fillers, pigments, and/or anti-oxidants.

For coatings there may be a myriad of other ingredients present, some of which are described below. In particular there may be other polymers (especially of low molecular weight, "functionalized oligomers") which are either inert or have functional group other than those that may act as (a)(ii) or (b)(i) or may act as (a)(ii) or (b)(i) and also react with other reactive materials in the coating composition.

Other additives also include polyaspartic esters, which are the reaction product of diamines, such as, isopherone diamine with dialkyl maleates, such as, diethyl maleate.

Representative of the functionalized oligomers that can be employed as component i or ii are the following:

Acid Oligomers: The reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like.

Hydroxyl Oligomers: The above acid oligomers further reacted with monofunctional epoxies such as butylene oxide, propylene oxide, and the like.

Anhydride Oligomers: The above acid oligomers further reacted with ketene.

Silane Oligomers: The above hydroxyl oligomers further reacted with isocyanato propyltrimethoxy silane.

Epoxy Oligomers: The diglycidyl ester of cyclohexane dicarboxylic acid, such as Araldite® CY-184 from Ciba Geigy, and cycloaliphatic epoxies, such as ERL®-4221, and the like from Union Carbide.

Isocyanate Oligomers: The isocyanurate trimer of hexamethylene diisocyanate, DESMODUR® 3300 from Bayer or Tolonate HDT® from Rhodia, Inc., and the isocyanurate trimer of isophorone diisocyanate, and the like.

Aldimine Oligomers: The reaction product of isobutyraldehyde with diamines such as isophorone diamine, and the like.

Ketimine Oligomers: The reaction product of methyl isobutyl ketone with diamines such as isophorone diamine.

Melamine Oligomers: Commercially available melamines such as CYMEL® 1168 from Cytec Industries, and the like.

AB-Funtionalized Oligomers: Acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-Functionalized Crosslinkers: Epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

The compositions of this invention may additionally contain a binder of a noncyclic oligomer, i.e., one that is linear or aromatic. Such noncyclic oligomers can include, for instance, succinic anhydride- or phthalic anhydride-derived moieties in the Acid Oligomers: such as described above.

Preferred oligomers (i) have weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25. The compositions of this invention can comprise 100% by weight of component (i) when (i) is a self-crosslinker. More typically, compositions will comprise 20–80 weight percent of (i), preferably 30 to 70 weight percent and more preferably 40 to 60 weight percent, with the balance being (ii).

The coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions can also contain a binder of an acrylic polymer of weight average molecular weight greater than 3,000, or a conventional polyester such as SCD®-1040 from Etna Product Inc. for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacrylylpropyl trimethoxysilane and the like.

The coating compositions can also contain a binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

The coating compositions can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by is conventional techniques such as spraying, electrostatic spraying, roller coating, dipping or brushing. As mentioned above atmospheric moisture may "diffuse" into the coating and cause curing, or alternatively just before the coating is applied it is mixed with an appropriate amount of water, as in a mixing spray head. Under these latter conditions it is important to apply the coating before it crosslinks. The present formulations are particularly useful as a dear coating for outdoor articles, such as automobile and other vehicle body parts. The substrate is generally prepared with a primer and or a color coat or other surface preparation prior to coating with the present compositions.

A layer of a coating composition is cured under ambient conditions in the range of 30 minutes to 24 hours, preferably in the range of 30 minutes to 3 hours to form a coating on the substrate having the desired coating properties. It is understood that the actual curing time depends upon the thickness of the applied layer and on any additional mechanical aids, such as, fans that assist in continuously flowing air over the coated substrate to accelerate the cure rate. If desired, the cure rate may be further accelerated by baking the coated substrate at temperatures generally in the range of from about 60° C. to 150° C. for a period of about 15 to 90 minutes. The foregoing baking step is particularly useful under OEM (Original Equipment Manufacture) conditions.

In the Examples and Experiments, the following abbreviations are used:
RB—round-bottomed
RT—room temperature
THF—tetrahydrofuran
TLC—thin layer chromatography Experiment 1

3.9-Diethyl-3.9-dihydroxymethyl-1,5,7,5,11-tetraoxaspiro[5,5]undecane

See also U.S. Pat. No. 5,808,108. To a one liter three neck RB flask equipped with a Dean-Stark trap, a reflux condenser, stirrer and under nitrogen trimethylolpropane (65.10 g, 0.48 mol) and toluene (600 mL) were added. The solution was refluxed for one h during which 2×20 mL portions were collected in the Dean-Stark trap and discarded. The solution was cooled to RT and tetraethylorthocarbonate (46.7 g, 0.24 mol) and 4-ethylbenzenesulfonic acid (0.3 g) were added. The resulting mixture was heated to reflux once again and the ethanol formed during the reaction was azeotropically removed. The azeotropic mixture was collected in the Dean-Stark trap until the temperature reached 110° C. (boiling point of pure toluene). At this point about 210 mL of material was collected, which was shaken with brine. The toluene phase was separated giving ~55 mL of ethanol. After the temperature reached 110° C. and the azeotropic mixture was collected the reaction was refluxed for an additional h and then allowed to cool to RT. TLC (hexane/ethyl acetate (1:3) showed the complete disappearance of the starting trimethylolpropane and the appearance of the orthocarbonate. Triethylamine (3 mL) was then added to the cooled solution. The toluene was removed at reduced pressure, resulting in a white solid material (crystallization may take up to two days). This material was dissolved in diethyl ether and allowed to recrystallize affording 19.28 g of material (first crop) after drying under vacuum. The filtrate was concentrated and recrystallized from ether affording an additional 20.07 g of material (second crop). $^{13}$C NMR (CDCl$_3$) (first crop): 6.10, 22.06, 35.72, 61.08, 65.80, 66.30 and 113.80 ($C_{orthocarbonate}$).

Experiment 2

3,9-Dibutyl-3,9-Diethyl-1,5,7,11-tetraoxaspiro[5.5]undecane

See also U.S. Pat. No. 5,808,108. In a three neck 500 mL RB flask equipped with a reflux condenser, a Dean-Stark trap and under nitrogen, 2-butyl-2-ethyl-1,3-propanediol (35.33 g, 0.22 mol) and toluene (350 mL) were added. The resulting mixture was heated to reflux for 2 h. The resulting solution was cooled to RT and 4-ethylbenzenesulfonic acid (0.35 g) and tetraethylorthocarbonate (21.3 g, 0.11 mol) were added. The reaction mixture was heated to reflux and the azeotropic solution collected in the Dean-Stark trap. The azeotropic mixture was measured and removed from the trap and poured into brine. The toluene phase was separated giving ~22 mL of ethanol, via shaking with brine. TLC of the reaction mixture showed the complete conversion of the starting diol. To the cooled reaction mixture was added triethylamine (3.0 mL). The reaction mixture was then concentrated at reduced pressure (rotovap) and then dried under vacuum. This crude material was then fractionally vacuum distilled and the fraction boiling at 175–181° C. at 240 Pa and collected (24.72 g) as a water white clear liquid. $^{13}$C NMR (CDCl$_3$): 4.59, 11.30, 20.72, 21.20, 22.29, 28.08, 31.78, 67.13, 112.20 ($C_{orthocarbonate}$).

Experiment 3

2.8-Dimethyl-1,5,7,11-tetraoxaspiro[5.5]undecane

See also U.S. Pat. No. 5,808,108. In a 500 mL RB flask equipped with a reflux condenser, a stirrer and a Dean Stark trap, 1,3-butanediol (20.0 g, 0.22 mol), and toluene (350 mL) were added. After placing under nitrogen the resulting solution was heated to reflux for two h to remove water from the mixture. The solution was cooled to RT and 4-ethylbenzenesulfonic acid (0.35 g) and tetraethylorthocarbonate (21.3 g, 0.11 mol) were added. The solution was heated to reflux and the azeotropic mixture collected; The reaction was refluxed until the temperature of the distilled reached 110° C. (boiling point of pure toluene). The collected azeotropic mixture was measured and weighed and then poured into brine and the organic phase was separated, which indicated ~22 mL of ethanol was collected. TLC analysis indicated that the reaction was complete by the disappearance of the diol and the appearance of the product at $R_f$=0.59 (silica gel, EtOAc/hexanes (3/2). The reaction was cooled to RT and triethylamine (2.5 mL) added. The toluene was removed at reduced pressure (rotovap) and the resulting liquid dried under vacuum. Vacuum distillation afforded four fractions of the desired product as a water white clear liquid boiling, bp: 70–75° C. at 40 Pa. Fractions 1 and 2 were slightly impure and were combined to give 5.715 g and fractions 3 and 4 were very pure and were combined to give 10.046 g. Overall yield: 15.761 g (75.66%). $^{13}$C NMR indicated the product to be a mixture of isomers.

Experiment 4

2,7-Dioctyl-1,4,6,9,-tetraoxaspiro[4,4]nonane

In a 500 mL RB flask equipped with a reflux condenser, a stirrer and a Dean Stark trap were added 1,2-decanediol (38.48 g, 0.22 mol), and toluene (350 mL). After placing under nitrogen the resulting solution was heated to reflux for two h to remove water from the mixture. The solution was cooled to RT and 4-ethylbenzenesulfonic acid (0.35 g) and tetraethylorthocarbonate (21.3 g, 0.11 mol). The solution was heated to reflux and the azeotropic mixture collected. The reaction was refluxed until the temperature of the distillated reached 110° C. (boiling point of pure toluene). The collected azeotropic mixture was measured and weighed and then poured into brine, the organic phase was separate, which indicated ~22 mL of ethanol was collected. The reaction was cooled to RT and triethylamine (2.5 mL) added. The toluene was removed at reduced pressure (rotovap) and the resulting liquid dried under vacuum. Vacuum distillation afforded the desired product as a water white clear liquid boiling at 195–197° C. at 240 Pa (25.44 g). $^{13}$C NMR indicated the product to be a mixture of isomers.

Experiment 5

N-Butyl Urethane of 3.9-Diethyl3.9-dihydroxymethyl-1,5,7,11-tetraoxaspiro-[5,5]undecane In a dry box, in an oven dried 300 mL RB flask equipped with a stirrer 3,9-diethyl-3,9-dihydroxymethyl-1,5,7,11-tetraoxaspiro[5,5]undecane (28.827 g) and toluene (100 mL) were added. The solution was stirred until the orthocarbonate dissolved. n-Butyl isocyanate (20.852 g) and dibutyltin dilaurate (1.05 g) were added. A reflux condenser was attached and the apparatus removed from the dry box where it was immediately placed under nitrogen and the resulting solution heated to 70° C. for 4 h. The toluene was removed under vacuum to give a very viscous material. $^{13}$C NMR of this straw colored material showed it to contain some toluene together with the desired urethane. This material was dissolved in ethyl acetate and then column chromatographed [silica gel, hexanes ethyl acetate (1/1), column (35 cm×5 cm)], $R_f$=0.47. The solvent was removed at reduced pressure (rotovap and then dried under vacuum to give 38.88 g of a viscous material. NMRs ($^1$H and $^{13}$C) showed the sample contained a small amount of ethyl acetate.

EXAMPLE 1

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added 1,4-diisocyanatobutane (0.72 g, 0.005 mol) followed by dibutyltin dilaurate (0.04 g). The resulting solution was stirred for ~5 min during which the ingredients became warm. To this solution was added 4-ethylbenzenesulfonic acid (0.03 g). The resulting solution was stoppered and removed from the dry box and then poured on a glass plate. After one h the coating was tacky and after 18 h a clear hard coating was obtained.

EXAMPLE 2

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (1.11 g, 0.005 mol) followed by dibutyltin dilaurate (0.04 g). The resulting solution was stirred for ~5 min during which the ingredients became warm. To this solution was added 4-ethylbenzenesulfonic acid (0.03 g). The resulting solution was stoppered and removed from the dry box and then poured on a glass plate. After one h the coating was slightly tacky and after 18 h a clear hard coating was obtained.

EXAMPLE 3

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.044 g). The resulting solution was stirred for ~10 min during which the ingredients became warm. To this solution was added 1,4-diisocyanatobutane (0.368 g) followed by 4-ethylbenzenesulfonic acid (0.046 g). The resulting solution was stoppered and removed from the dry box and then poured on a glass plate. After 18 h a clear hard coating was obtained. Five days later, the Pendulum Hardness Tester gave a Persoz hardness of 134.

EXAMPLE 4

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.041 g). The resulting solution was stirred for ~10 min during which the ingredients became warm. To this solution was added isophorone diisocyanate (0.555 g, 0.0025 mol) followed by 4-ethylbenzenesulfonic acid (0.03 g). The resulting solution was stoppered and removed from the dry box and then poured on a glass plate. After 18 h a clear hard coating was obtained. Five days later, the Pendulum Hardness Tester gave a Persoz hardness of 276. Attenuated total reflectance (ATR) IR of the coating on the glass plate showed a very strong absorbance at 1696 cm$^{-1}$ indicating the presence of the urethane functionality.

EXAMPLE 5

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.075 g). The resulting solution was stirred for ~10 min during which the ingredients became warm. To this solution was added 1,4-diisocyanatobutane (0.72, 0.00519 mol), 3,9-dibutyl-3,9-diethyl-1,5,7,11-tetraoxaspiro[5,5]undecane (0.845 g, 0.00257 mol) followed by 4-ethylbenzenesulfonic acid (0.077 g). The resulting solution was stoppered and removed from the dry box and then poured on a glass plate while retaining a small amount in the vial. After 18 h a clear hard coating was obtained. After two weeks the material in the stoppered vial was still a free flowing liquid with no apparent increase in viscosity. This demonstrates the pot life of the formulation in which it can be kept for a long time as long as moisture is excluded.

EXAMPLE 6

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.075 g). The resulting solution was stirred for ~10 min during which the ingredients became warm. To this solution was added isophorone diisocyanate (1.10 g, 0.005 mol) 3,9-dibutyl-3,9-diethyl-1,5,7,11-tetraoxaspiro[5,5]undecane (0.845 g, 0.00257 mol) followed by 4-ethylbenzenesulfonic acid (0.110 g). The resulting solution was stoppered and removed from the dry box and then poured on a glass plate, except for a small amount retained in the vial. After 18 h a clear hard coating was obtained. After two weeks the material in the stoppered vial was still a free flowing liquid with no apparent increase in viscosity. This demonstrates the pot life of the formulation in which it can be kept unchanged as long as moisture is excluded.

EXAMPLE 7

Coating Formulation

In a dry box, Desmodour® N3390 (1,6-diisocyanatohexane trimer from Bayer) (1.00 g), the n-butyl urethane of 3,9-diethyl-3,9-dihydroxymethyl-1,5,7,11-tetraoxaspiro[5,5]undecane (1.4 g) and ethylbenzenesulfonic acid (0.06 g)

were added at a vial and THF (~1 mL) was then added to dissolved the mixture. After a homogeneous solution formed the contents was poured on a glass plate and allowed to cure. After 24 h the resulting coating was a bit tacky to the touch. After 48 h a relatively hard coating resulted.

EXAMPLE 8

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.075 g). The resulting solution was stirred for ~10 min during which the ingredients became warm. To this solution was added isophorone diisocyanate (1.11 g, 0.005 mol) 2,8-dimethyl1,5,7,11-tetraoxaspiro[5,5]undecane (0.483 g, 0.00257 mol) followed by 4-ethylbenzenesulfonic acid (0.07 g). The resulting solution was stoppered and removed from the dry box and then poured on a glass plate. After one h the coating was still tacky (almost wet) to the touch. After 18 h a clear hard coating was obtained. Five days later, the Pendulum Hardness Tester gave a Persoz hardness of 104.

EXAMPLE 9

Coating Formulation

In a dry box, 3,9-diethyl-3,9-dihydroxymethyl-1,5,7,11-tetraoxaspiro[5,5]undecane (0.69 g, 0.0025 mol) was dissolved in THF (2.0 g) in a glass vial. To this solution was added isophorone diisocyanate (0.555 g, 0.0025 mol) followed by dibutyltin dilaurate (0.083 g). The resulting solution was stirred for ~10 min during which the ingredients became warm. To this solution was added isophorone diisocyanate (1.11 g, 0.005 mol), 2,7-dioctyl-1,4,6,9-tetraoxaspiro[4.4]nonane (0.914 g, 0.00257 mol) followed by 4-ethylbenzenesulfonic acid (0.084 g). The resulting solution was stoppered and removed from the dry box and then poured on a glass plate. After one h the coating was still tacky (almost wet) to the touch. After 18 h a clear hard coating was obtained. Five days later, a Pendulum Hardness Tester gave a Persoz hardness of 162.

The coating was removed from the glass plate and a section placed in each of the following solvents (~10 mL): acetone, ethyl acetate, methyl ethyl ketone and toluene. Each mixture was shaken for 7 d. Upon removal the coatings were intact and showed no swelling or discoloration, thus indicating that the coating was cross-linked.

EXAMPLE 10

Coating Formulation

The clearcoats were drawn down over electrocoated steel panels or thermoplastic olefin (TPO), using a 0.015 mm (6 mil) drawdown blade. The microhardness of the coatings was measured using a Fischerscope hardness tester (model HM 100V, available from Fischer Technology, Inc., Windsor, Conn., USA). The tester was set for maximum force of 100 Nm ramped in series of 50, 1 second steps. The hardness was recorded in N/mm². The swell ratio of the free films (removed from TPO) was determined by swelling in methylene chloride. The free film was placed between two layers of aluminum foil and using a LADD punch, a disc of about 3.5 mm diameter was punched out of the film. The aluminum foil was removed from either side of the free film. Using a microscope with 10× magnification and a filar lens the unswollen diameter ($D_o$) of the film measured. Four drops of methylene chloride were added to the film, the film was allowed to swell for a few seconds and then a glass slide was placed over it The swell ratio was then calculated as: swell ratio=$(D_s)^2/(D_o)^2$.

In a glass jar 11.96 g of the product of Experiment 3 was combined with 0.84 g of butyl acetate, 1.2 g of a 2% dibutyl tin dilaurate solution in ethyl acetate, and 0.48 grams of a 10% BYK® 301 solution (flow additive available from BYK-Chemie, Wallingford, Conn., in propylene glycol monomethylether acetate). To this was added 19.58 g of Desmodur® BA Z4470 (IPDI isocyanurate trimer available from Bayer), 22.40 g of Desmodur® 3300 (hexamethylene diisocyanate trimer available from Bayer) and 3.54 g of butyl acetate. This mixture was stirred and then 4.09 g of a 40% solution of Nacure® XP-221 (a 70% solution of dodecylbenzene sulfonic acid in isopropanol, available from King Industries, Norwalk, Conn., USA) was added and the mixture was stirred. The mixture was drawndown to give coatings of ~0.05 mm (~2 mil) in thickness. After one day the coating had a Persoz pendulum hardness of 237, a Fischerscope hardness of 95 N/mm², and a swell ratio of 2.16.

What is claimed is:

1. A composition, comprising,
  (a) (i) a first polymer having one or more intact spiroorthocarbonate groups attached to a molecule of said first polymer each said intact spiroorthocabornate group having the general formula,

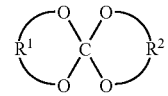

wherein $R^1$ and $R^2$ are hydrocarbylene or substituted hydrocarbylene bridging groups having at least two bridging carbons and wherein $R^1$ and $R^2$ each independently have the formula,

wherein n is 0 or 1; and
  each of $R^3$, $R^4$, $R^5$, $R^6$, $R^7$ and $R^8$ independently is selected from the aroup consisting of hydrogen, hydrocarbyl and substituted hydrocarbyl, provided that any two of $R^3$, $R^4$, $R^5$, $R^6$, $R^7$ and $R^8$ vicinal or geminal to each other taken together may from a ring wherein the spiroorthocarbonate groups are hydrolyzed with water to generate hydroxyl groups; and
  (ii) a crosslinking agent containing first functional groups selected from the group consisting of isocyanates, epoxide, carboxylic acid anhydrides, melamine and silanes which react with hydroxyl groups, provided that said crosslinking agent has an average of at least 2 first functional groups per molecule of said crosslinking agent; and
  (iii) optionally one or more of: one or more solvents; one or more first catalysts for the reaction of said hydroxyl groups with said first functional groups; and one or more second catalysts for hydrolysis of said spiroorthocarbonate groups; or
  (b) (i) a second polymer having second functional groups which react with hydroxyl groups selected from the group consisting of isocyanates, epoxides, carboxylic acid anhydrides, melamine and silanes, provided that said second polymer has an average of at least 2 second functional groups per molecule of said second polymer;

(ii) a compound containing at least one intact spiroorthocarbonate group each said intact spiroorthocarbonate group having the general formula,

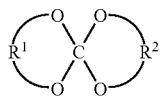

wherein $R^1$ and $R^2$ are hydrocarbylene or substituted hydrocarbylene bridging groups having at least two bridging carbons and wherein $R^1$ and $R^2$ each independently have the formula,

wherein n is 0 or 1; and each of $R^3$, $R^4$, $R^5$, $R^6$, $R^7$ and $R^8$ independently is selected from the group consisting of hydrogen, hydrocarbyl and substituted hydrocarbyl, provided that any two of $R^3$, $R^4$, $R^5$, $R^6$, $R^7$ and $R^8$ vicinal or geminal to each other taken together may form a ring; and (iii) optionally one or more of: one or more solvents; one or more first catalysts for the reaction of said hydroxyl groups with said second functional groups; and one or more second catalysts for hydrolysis of said spiroorthocarbonate groups.

2. A composition, comprising, (a) (i) a first polymer having one or more intact spiroorthocarbonate groups attached to a molecule of said first polymer selected from the groups consisting of isocyanates epoxides carboxylic acid anhydrides, melamine and silanes;

(ii) a crosslinking agent containing first functional groups which react with hydroxyl groups, provided that said crosslinking agent has an average of at least 2 first functional groups per molecule of said crosslinking agent;

(iii) water; and (iv) optionally one or more of: one or more solvents; one or more first catalysts for the reaction of said hydroxyl groups with said first functional groups; and one or more second catalysts for hydrolysis of said spiroorthocarbonate groups; or (b) (i) a second polymer having second functional groups which react with hydroxyl groups, provided that said second polymer has an average of at least 2 second functional groups per molecule of said second polymer;

(ii) a compound containing at least one intact spiroorthocarbonate group;

(iii) water; and (iv) optionally one or more of: one or more solvents; one or more first catalysts for the reaction of said hydroxyl groups with said second functional groups; and one or more second catalysts for hydrolysis of said spiroorthocarbonate groups.

3. The composition as recited in claim 1 which is reacted with water to form a crosslinked polymeric material.

4. The composition as recited in claim 2 which is reacted with water to form a crosslinked polymeric material.

5. The composition as recited in claim 1 which is a coating composition.

6. The composition as recited in claim 2 which is a coating composition.

7. The composition as recited in claim 5 wherein the functional group which reacts with the hydroxyl group is isocyanate.

8. The composition as recited in claim 5 wherein the second polymer is an oligomer.

9. The composition as recited in claim 8, wherein, the functional group which reacts with the hydroxyl group is isocyanate.

10. The composition as recited in claim 5 wherein the composition further comprises pigments.

11. A substrate coated with a coating composition as recited in claim 5.

12. The composition recited in claim 1 wherein $R^1$ and $R^2$ are the same.

13. The composition recited in claim 1 wherein each of $R^3$, $R^4$, $R^5$, $R^6$, $R^7$ and $R^8$ independently is selected from the group consisting of hydrogen, alkyl, and hydroxyalkyl.

* * * * *